United States Patent [19]
Sakashita et al.

[11] Patent Number: 5,484,875
[45] Date of Patent: Jan. 16, 1996

[54] COPOLYMERIC POLYCARBONATE PRODUCTION METHOD

[75] Inventors: Takeshi Sakashita; Tomoaki Shimoda; Kotaro Kishimura, all of Iwakuni; Shuichi Uchimura, Otake, all of Japan

[73] Assignee: GE Plastics Japan, Tokyo, Japan

[21] Appl. No.: 444,703

[22] Filed: May 19, 1995

Related U.S. Application Data

[62] Division of Ser. No. 212,077, Mar. 14, 1994, Pat. No. 5,418,315, which is a division of Ser. No. 903,318, Jun. 24, 1992, Pat. No. 5,324,809.

[30] Foreign Application Priority Data

Jun. 28, 1991 [JP] Japan ..................... 3-159145

[51] Int. Cl.$^6$ ................. C08G 63/02; C08G 64/00
[52] U.S. Cl. ................. 528/198; 528/125; 528/126; 528/171; 528/199; 528/204
[58] Field of Search ..................... 528/196, 125, 528/126, 171, 198, 199, 204

[56] References Cited

U.S. PATENT DOCUMENTS 3,489,716  1/1970  Calkins ..................... 528/196
5,306,801  4/1994  Sakashita et al. ..................... 528/198

FOREIGN PATENT DOCUMENTS

| | | |
|---|---|---|
| 0360578 | 3/1990 | European Pat. Off. . |
| 0435124 | 7/1991 | European Pat. Off. . |
| 228041 | 5/1960 | France . |
| 3041298 | 11/1979 | Germany . |
| 4038768 | 6/1991 | Germany . |
| 1272631 | 10/1989 | Japan . |
| 4072327 | 3/1992 | Japan . |

*Primary Examiner*—James J. Seidleck
*Assistant Examiner*—Terressa M. Mosley

[57] ABSTRACT

The present invention relates to a method for preparing copolymeric polycarbonates which comprises melt polycondensing a mixture of an aromatic dihydroxy compound containing an amount of 2–90 mol % of hydroquinone or substituted hydroquinones and a diester carbonate in the presence of a catalyst containing an alkali metal compound or an alkaline earth metal compound in an amount of $1 \times 10^{-8}$ to $5 \times 10^{-6}$ mole per mole of the total amount of the aromatic dihydroxy compound, then adding an acidic compound to the melt polycondensation product.

7 Claims, No Drawings

COPOLYMERIC POLYCARBONATE PRODUCTION METHOD

This is a divisional of co-pending U.S. patent application Ser. No. 08/212,077 filed on Mar. 14, 1994 which is division of Ser. No. 07/903,318 filed on Jun. 24, 1992, now U.S. Pat. No. 5,324,809.

DETAILED DESCRIPTION OF THE INVENTION

1. Field of the Invention

The present invention relates to a method for preparing copolymeric polycarbonates which have excellent mechanical properties, heat resistance and transparency, and which also have improved chemical resistance, hue, and residence stability.

2. Technical Background of the Invention

Polycarbonates have excellent mechanical properties such as impact resistance, as well as excellent heat resistance, transparency and other properties. They are widely used in applications such as various types of mechanical components, optical disks, and automotive parts.

However, further improvements in the resistance to solvents and other chemicals are desired in polycarbonates such as these.

In response to such desires, Japanese Published Unexamined Patent Application [Kokai] No. 52-109,591 (1977) proposes a method for preparing copolymeric polycarbonates that use hydroquinone and/or ester-forming derivatives thereof as part of the aromatic dihydroxy compound; this gives copolymeric polycarbonates having an excellent solvent resistance. However, in the melt polycondensation method that uses a conventional diester carbonate cited in the above patent application (transesterification aromatic [sic]), the hydroquinone is oxidized during polycondensation and readily undergoes brown or yellow discoloration; hence, following polycondensation, there is a tendency for discolored copolymeric polycarbonate to be obtained. This method also has other drawbacks such as a decrease in the molecular weight during molding; hence, an improvement in the residence stability is also desired.

In conventional surfacial polymerization methods, low-molecular-weight copolymeric polycarbonates are formed and precipitate out, making it difficult to obtain high-molecular-weight polycarbonate.

Hence, the emergence of polycarbonates having a better chemical resistance and residence stability, as well as an outstanding transparency and hue without losing the properties intrinsic to polycarbonates has been awaited.

The inventors conducted intensive studies aimed at obtaining polycarbonates having improved chemical resistance, residence stability, and hue without losing the excellent mechanical properties, heat resistance and transparency intrinsic to polycarbonates. As a result of these studies, they found that the above object can be achieved by using a specific catalyst and preferably by also adding specific additives when an aromatic dihydroxy compound containing hydroquinone or substituted hydroquinone is copolymerized with a diester carbonate by means of a melt polycondensation method. This discovery ultimately led to the present invention.

Object of the Invention

The present invention was conceived in light of prior art such as that just described. Its aim is to provide a production method capable of preparing copolymeric polycarbonates in which the chemical resistance, hue, and residence stability have been even further improved.

Gist of the Invention

The method for preparing copolymeric polycarbonates according to the present invention is characterized by inducing the melt polycondensation of an aromatic dihydroxy compound containing an amount of 2–90 mol % of hydroquinone and/or substituted hydroquinone with a diester carbonate in the presence of (a) a catalyst containing alkali metal compounds and/or alkaline earth metal compounds in an amount of $1 \times 10^{-8}$ to $5 \times 10^{-6}$ mole per mole of the total amount of the aromatic dihydroxy compound.

In the copolymeric polycarbonate production method according to the present invention, it is preferable to add acidic compounds, and also epoxy compounds and phosphorus compounds, to the reaction product obtained by melt polycondensation in the above manner.

Concrete Description of the Invention

A concrete description of the copolymeric polycarbonate production method according to the present invention shall now be given.

The method for preparing copolymeric polycarbonates according to the present invention is characterized by inducing the melt polycondensation of an aromatic dihydroxy compound containing an amount of 2–90 mol % of hydroquinone and/or substituted hydroquinone with a diester carbonate in the presence of (a) a catalyst containing alkali metal compounds and/or alkaline earth metal compounds in an amount of $10^{-8}$ to $5 \times 10^{-6}$ mole per mole of the total amount of the aromatic dihydroxy compound.

This kind of hydroquinone or substituted hydroquinone is represented by formula [I] below.

Compound 2

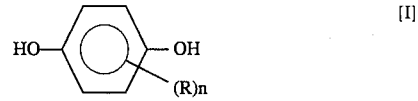

[I]

In above formula [I], R may each represent hydrocarbon groups having 1–10 carbons, their halides, or halogens; these groups may be the same or different. Also, n is an integer from 0 to 4.

Specific examples of substituted hydroquinones that may be cited include hydroquinone, 3-methylhydroquinone, 3-ethylhydroquinone, 3-propylhydroquinone, 3-butylhydroquinone, 3-t-butylhydroquinone, 3-phenyl-hydroquinone, 3-cumylhydroquinone, 2,3,5,6-tetrafluorohydroquinone and 2,3,5,6-tetrabromohydroquinone.

Of these, the use of hydroquinone is preferable.

The aromatic dihydroxy compounds used in this invention contain 2–90 mol %, preferably 5–70 mol %, and most preferably 10–60 mol %, of this kind of hydroquinone and/or substituted hydroquinones.

Aromatic dihydroxy compounds other than hydroquinone and/or substituted hydroquinone are contained in an amount of 10–98 mol %, preferably 30–95 mol %, and most preferably 40–90 mol %.

Although there is no particular limit on the aromatic dihydroxy compounds other than hydroquinone and /or substituted hydroquinones, one can generally cite compounds having formula [II] below, and especially compounds in which the phenyl groups in formula [II] below are substituted with aliphatic groups and halogen groups.

Compound 3

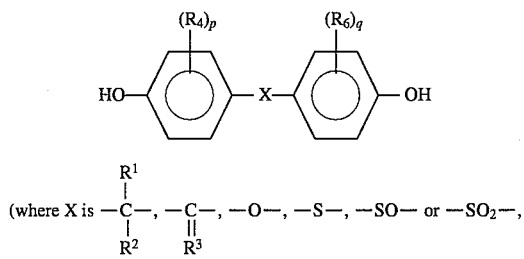

(where X is $-\underset{\underset{R^2}{|}}{\overset{\overset{R^1}{|}}{C}}-$, $-\underset{\underset{R^3}{\|}}{C}-$, $-O-$, $-S-$, $-SO-$ or $-SO_2-$, $R^1$ and $R^2$ are hydrogen atoms or monovalent hydrocarbon groups; $R^3$ is a divalent hydrocarbon group; $R^4$ and $R^5$, which may the same or different, are halogens or monovalent hydrocarbon groups; and p and q are integers from 0 to 4).

Specific examples that may be cited of the above aromatic dihydroxy compounds include the following compounds: bis(hydroxyaryl)alkanes such as bis(4-hydroxyphenyl)methane, 1,1-bis(4-hydroxyphenyl)ethane, 2,2-bis( 4-hydroxyphenyl)propane, 2,2-bis(4-hydroxyphenyl)-butane, 2,2-bis(4-hydroxyphenyl)octane, bis(4-hydroxyphenyl)phenylmethane, 2,2-bis(4-hydroxy-1-methylphenyl)propane, 1,1-bis(4-hydroxy-t-butylphenyl)propane and 2,2-bis(4-hydroxy-3-bromophenyl)propane; bis-(hydroxyaryl)cycloalkanes such as 1,1-bis (hydroxyphenyl)cyclopentane and 1,1-bis(4-hydroxyphenyl)cyclohexane; dihydroxyaryl ethers such as 4,4'-dihydroxydiphenyl ether and 4,4'-dihydroxy-3,3'-dimethylphenyl ether; dihydroxydiarylsulfides such as 4,4'-dihydroxydiphenylsulfide and 4,4'-dihydroxy-3,3'-dimethyldiphenylsulfide; dihydroxydiarylsulfoxides such as 4,4'-dihydroxydiphenylsulfoxide and 4,4'-dihydroxy-3,3'-dimethyldiphenylsulfoxide; and dihydroxydiarylsulfones such as 4,4'-dihydroxydiphenylsulfone and 4,4'-dihydroxy- 3,3'-dimethyldiphenylsulfone.

Of these, the use of 2,2-bis(4-hydroxyphenyl)-propane is especially desirable. Specific examples that may be cited of the diester carbonate include diphenyl carbonate, ditolyl carbonate, bis(chlorophenyl) carbonate, m-cresyl carbonate, dinaphthyl carbonate, bis(diphenyl) carbonate, diethyl carbonate, dimethyl carbonate, dibutyl carbonate and dicyclohexyl carbonate.

Of these, the use of diphenyl carbonate is especially desirable.

The above-cited diester carbonates may include preferably no more than 50 mol %, and most preferably no more than 30 mol %, of dicarboxylic acids or dicarboxylates.

Examples of such dicarboxylic acids or dicarboxylates that may be used include terephthalic acid, isophthalic acid, sebacic acid, decanedioic acid, dodecanedioic acid, diphenyl sebacate, diphenyl terephthalate, diphenyl isophthalate, diphenyl decanedioate and diphenyl dodecanedioate.

When diester carbonates containing such dicarboxylic acids or dicarboxylates are polycondensed with the above-mentioned aromatic dihydroxy compounds, polyester polycarbonates are obtained.

In the present invention, when the polycarbonate is prepared, the above-described diester carbonates should be used in an amount of 1.0–1.30 mol, and preferably 1.01–1.20 mole, per mole of the overall aromatic dihydroxy compound.

In this invention, when preparing the polycarbonate, a polyfunctional compound having three or more functional groups per molecule may be used along with the above-mentioned aromatic dihydroxy compound and diester carbonate.

These polyfunctional compounds are preferably compounds having phenolic hydroxyl groups or carboxyl groups, with compounds having three phenolic hydroxyl groups being especially desirable. Specific examples that may be cited include 1,1,1-tris (4-hydroxyphenyl)-ethane, 2,2',2"-tris(4-hydroxyphenyl)diisopropylbenzene, (∝-methyl-∝,∝',∝'-tris(4-hydroxyphenyl)-1,4-diethylbenzene, ∝,∝',∝"-tris(4-hydroxyphenyl)-1,3,5-triisopropylbenzene, fluoroglycine, 4,6-dimethyl-2,4,6-tri( 4-hydroxyphenyl)heptane-2, 1,3,5-tri(4-hydroxyphenyl)benzene, 2,2-bis-[4, 4-(4,4'-dihydroxyphenyl)-cyclohexyl]propane, trimellitic acid, 1,3,5-benzene-tricarboxylic acid and pyromellitic acid.

Of these, the use of 1,1,1-tris(4-hydroxyphenyl)-ethane, ∝,∝',∝"-tris(4-hydroxyphenyl)-1,3,5-triisopropylbenzene or the like is preferable.

The polyfunctional compounds are generally used in an amount of no more than 0.03 mole, preferably 0.001–0.02 mole, and most preferably 0.001–0.01 mole, per mole of the total amount of aromatic dihydroxy compound.

In the present invention, a copolymeric polycarbonate is prepared by the melt polycondensation of the above-mentioned aromatic dihydroxy compound containing hydroquinone and/or substituted hydroquinones with the above-mentioned diester carbonate in the presence of a catalyst.

When an attempt is made to prepare copolymeric polycarbonate containing constituent units derived from hydroquinone and/or substituted hydroquinones by the direct reaction of an aromatic dihydroxy compound containing hydroquinone and/or substituted hydroquinones with phosgene, a high-molecular-weight product is difficult to obtain.

Alkali metal compounds and/or alkaline earth metal compounds (a) are used as the catalyst in the present invention.

Preferable examples that may be cited of alkali metal compounds and alkaline earth metal compounds such as these include the organic acid salts, inorganic acid salts, oxides, hydroxides, hydrides and alcoholates of alkali metals and alkaline earth metals.

Specific examples of such alkali metal compounds include sodium hydroxide, potassium hydroxide, lithium hydroxide, sodium bicarbonate, potassium bicarbonate, lithium bicarbonate, sodium carbonate, potassium carbonate, lithium carbonate, sodium acetate, potassium acetate, lithium acetate, sodium stearate, potassium stearate, lithium stearate, sodium boron hydride, lithium boron hydride, sodium boron phenylate, sodium benzoate, potassium benzoate, lithium benzoate, disodium hydrogen phosphate, dipotassium hydrogen phosphate, dilithium hydrogen phosphate, the disodium, dipotassium and dilithium salts of hisphenol A, and the sodium, potassium and lithium salts of phenol.

Specific examples of such alkaline earth metal compounds that may be cited include calcium hydroxide, barium hydroxide, magnesium hydroxide, strontium hydroxide, calcium hydrogen carbonate, barium hydrogen carbonate, magnesium hydrogen carbonate, strontium hydrogen carbonate, calcium carbonate, barium carbonate, magnesium carbonate, strontium carbonate, calcium acetate, barium acetate, magnesium acetate, strontium acetate, calcium stearate, barium stearate, magnesium stearate and strontium stearate.

These compounds may be used alone or as combinations thereof.

These alkali metal compounds and/or alkaline earth metal compounds (a) are used in an amount of $1\times10^{-8}$ to $5\times10^{-6}$ mole, preferably $1\times10^{-7}$ to $2\times10^{-6}$ mole, and most preferably $1\times10^{-7}$ to $1\times10^{-6}$ mole, per mole of the aromatic dihydroxy compound.

When the amount in which the alkali metal compounds or alkaline earth metal compounds (a) are used is $1\times10^{-8}$ to $5\times10^{-6}$ mole per mole of the total amount of the aromatic dihydroxy compound, a high polymerization activity can be maintained. By also adding an acidic compound (described later) in an amount that does not have an adverse influence on the properties of the copolymeric polycarbonate thus obtained, the basicity exhibited by these compounds can be fully neutralized or weakened, thereby making it possible to obtain copolymeric polycarbonates having an outstanding long-term melt stability with an excellent hue, heat resistance, water resistance and weatherability.

In this invention, along with the above-described alkali metal compounds and/or alkaline earth metal compounds (a), it is also possible to use (b) basic compounds and (c) boric acid compounds as the catalyst.

This basic compound (b) may be, for example, a nitrogen-containing basic compound that readily decomposes or volatilizes at high temperatures. Specific examples that may be cited include the following compounds.

Ammonium hydroxides having alkyl, aryl, or aralkyl groups, such as tetramethylammonium hydroxide ($Me_4NOH$), tetraethylammonium hydroxide ($Et_4NOH$), tetrabutylammonium hydroxide ($Bu_4NOH$) and trimethylbenzylammonium hydroxide ($\phi$—$CH_2(Me)_3NOH$); tertiary amines such as trimethylamine, triethylamine, dimethylbenzylamine and triphenylamine secondary amines having the formula $R_2NH$ (where R is an alkyl such as methyl or ethyl, an aryl group such as phenyl or toluyl, or the like); primary amines having the formula $RNH_2$ (where R is the same as above); imidazoles such as 2-methylimidazole and 2-phenylimidazole; and basic salts such as ammonia. tetramethylammonium borohydride ($Me_4NBH_4$), tetrabutylammonium borohydride ($Bu_4NBH_4$), tetrabutylammonium tetraphenyl borate ($Bu_4NBPh_4$) and tetramethylammonium tetraphenylborate ($Me_4NBPh_4$).

Of these, preferable use can be made of tetraalkylammonium hydroxides, and especially low-metal-impurity tetraalkylammonium hydroxides intended for use in electronics.

Examples that may be cited of the boric acid compounds (c) include boric acid and borates.

Borates having the following formula may be used.

$$B(OR)_n(OH)_{3-n}$$

where R is an alkyl such as methyl or ethyl, or an aryl such as phenyl; and n is 1, 2 or 3.

Specific examples that may be cited of borates such as these include trimethyl borate, triethyl borate, tributyl borate, trihexyl borate, triheptyl borate, triphenyl borate, tritolyl borate and trinaphthyl borate.

A first combination of
(a) alkali metal compounds and/or alkaline earth metal compounds, and
(b) nitrogen-containing basic compounds may be cited as a combination preferable for use as the catalyst in the present invention.

In this instance, the alkali metal compounds and/or alkaline earth metal compounds (a) are used in the above-indicated amounts, and the nitrogen-containing basic compounds (b) are used in an amount of $1\times10^{-6}$ to no more than $1\times10^{-1}$ mole, and preferably $1\times10^{-5}$ to $1\times10^{-2}$ mole. It is preferable for the amount in which the nitrogen-containing basic compound (b) is used to be $1\times10^{-6}$ to $1\times10^{-1}$ mole per mole of the total aromatic dihydroxy compound because the transesterification reaction and polymerization reaction to proceed at a sufficient rate, and copolymeric polycarbonate having excellent properties such as hue, heat resistance and water resistance can be obtained.

Catalysts obtained by combining alkali metal compounds and/or alkaline earth metal compounds (a) and nitrogen-containing basic compounds (b) in this way are able to form at a high polymerization activity high-molecular-weight copolymeric polycarbonates having an excellent heat resistance and water resistance, and also having an improved color tone.

In the present invention, preferable use can be made of catalysts composed of a second combination of
(a) alkali metal compounds and/or alkaline earth metal compounds, and
(c) boric acid or borates, or catalysts composed of a third combination of
(a) alkali metal compounds and/or alkaline earth metal compounds,
(b) nitrogen-containing basic compounds, and
(c) boric acid or borates.

In the catalysts consisting of combinations such as these, it is preferable to use the alkali metal compounds or alkaline earth metal compounds (a), and the nitrogen-containing basic compounds (b) in the above-mentioned amounts.

The boric acid or borates (c) are normally used in an amount of $1\times10^{-8}$ to $1\times10^{-1}$ mole, preferably $1\times10^{-7}$ to $1\times10^{-2}$ mole, and most preferably $1\times10^{-6}$ to $1\times10^{-4}$ mole.

When the amount in which the boric acid or borates (c) are used is $1\times10^{-8}$ to $1\times10^{-1}$ mole per mole of the total amount of the aromatic dihydroxy compound, this is desirable in that it makes it possible to obtain a copolymeric polycarbonate in which the molecular weight does not readily decrease after heat aging and which has excellent hue, heat resistance and water resistance.

In particular, those catalysts composed of the third combination of (a) alkali metal compounds and/or alkaline earth metal compounds, (b) nitrogen-containing basic compounds, and (c) boric acid or borates are able to produce high-molecular-weight copolymeric polycarbonates having excellent transparency, heat resistance and water resistance and having an improved color tone.

Polycondensation reactions of the aromatic dihydroxy compound containing hydroquinone and/or substituted frydroquinones with the diester carbonate using catalysts such as these can be carried out under the same conditions as the polycondensation reaction conditions between aromatic dihydroxy compounds and diester carbonates hitherto known to the art.

Specifically, in the step one reaction, the aromatic dihydroxy compound and the diester carbonate are reacted at normal pressure, a temperature of 80°–250° C., preferably 100°–230° C., and most preferably 120°–190° C., and for 0–5 hours, preferably 0–4 hours, and most preferably 0–3 hours. Next, the reaction temperature is raised and the reaction between the aromatic dihydroxy compound and the diester carbonate is carried out while placing the reaction system under a vacuum; polycondensation between the aromatic dihydroxy compound and the diester carbonate is ultimately carried out under a vacuum of 5 mmHg or less, and preferably 1 mmHg or less, and at 240°–320° C.

The polycondensation reaction described above may be carried out as a continuous process or as a batch-type process. The reaction apparatus used when carrying out the above reaction may be a tank-type, tube-type, or column-type apparatus.

The copolymeric polycarbonate obtained in the above manner has a melt flow rate (MFR), as measured in general accordance with JIS K 7210 (300° C.; load, 1.2 kg) of 2–100 g/10 rain, and preferably 5–50 g/10 min.

In the methods for preparing copolymeric polycarbonates according to the present invention, acidic compounds and, where necessary, epoxy compounds, are added to the copolymeric polycarbonate obtained in the above manner as the reaction product.

As long as the acidic compounds used in this invention can neutralize alkaline compounds such as the alkali metal compounds, alkaline earth metal compounds or the like used as the catalyst, these may be Lewis acid compounds, Bro/nsted acid compounds or sulfur atom-containing strongly acidic esters.

The Brönsted acid compounds in particular have a pKa in a 25° C. solution of 5 or less, and preferably 3 or less.

By using an acidic compound having a pKa value like this, the alkali metal or alkaline earth metal used as the catalyst can be neutralized and the copolymeric polycarbonate thus obtained can be stabilized.

Specific examples that may be cited of the Lewis acid compounds include boron compounds such as zinc borate and boron phosphate; borates such as $B(OCH_3)_3$, $B(OEt)3$. $B(OPh)_3$; aluminum compounds such as aluminum stearate and aluminum silicate; zirconium compounds such as zirconium carbonate, zirconium alkoxide and zirconium hydroxycarbonate; gallium compounds such as gallium phosphate and gallium antimony; germanium compounds such as germanium oxide and organogermanium; tin compounds such as tetra- and hexaorganotin. $PhOSn(Bu)_2OSn(Bu)_2Ph$; antimony compounds such as antimony oxide and alkylantimony; bismuth compounds such as bismuth oxide and alkylbismuth; zinc compounds such as $(CH_3COO)_2Zn$ and zinc stearate; and titanium compounds such as alkoxytitanium and titanium oxide.

In the above formulas, Ph stands for phenyl groups. Et for ethyl groups and Bu for butyl groups.

Examples that may be cited of Brönsted acid compounds include phosphoric acid, phosphorous acid, hypophosphorous acid, pyrophosphoric acid. polyphosphoric acid, boric acid, hydrochloric acid, hydrobromic acid. adipic acid, azelaic acid, dodecanoic acid, L-ascorbic acid, asparaginic acid, benzoic acid, formic acid, acetic acid, citric acid, glutamic acid, salicylic acid, nicotinic acid, fumaric acid realsic acid, oxalic acid and sulfur atom-containing acids and their esters.

Examples that may be cited of sulfur atom-containing acids include benzenesulfinic acid, toluenesulfinic acid, sulfuric acid and sulfurous acid,; examples of the esters of sulfur atom-containing atoms include dimethylsulfuric acid and diethylsulfuric acid.

The addition of compounds having formula [III] below [B-1] as the sulfur atom-containing acidic compounds is especially desirable.

Compound 4

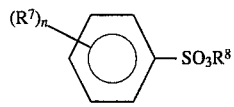

where $R^7$ is a hydrocarbon group with 1–6 carbons (in which the hydrogens may be substituted with halogens). $R^8$ is a hydrogen or a hydrocarbon group with 1–8 carbons (in which the hydrogens may be substituted with halogens), and n is an integer from 0 to 3.

Specific examples that may be cited of compounds having the above formula include sulfonic acids such as benzenesulfonic acid and p-toluenesulfonic acid; and sulfonates such as methyl benzenesulfonate, ethyl benzenesulfonate, butyl benzenesulfonate, octyl benzenesulfonate, phenyl benzenesulfonate, methyl p-toluenesulfonate, ethyl p-toluenesulfonate, butyl p-toluenesulfonate, octyl p-toluenesulfonate and phenyl p-toluenesulfonate.

Sulfonic acid compounds such as trifluoromethanesulfonic acid, naphthalenesulfonic acid, sulfonated polystyrene and methyl acrylate-styrene sulfonate copolymers may also be used.

Of these acidic compounds, the use of acidic compounds containing sulfur atoms, phosphorus atoms and the like is preferable, with acidic compounds containing sulfur atoms being especially preferable.

In this invention, it is preferable to use compounds where, in above formula [III], $R^7$ and $R^8$ are substituted fatty hydrocarbon groups with 1–6 carbons, and n is the integer 0 or 1. More specifically, the use of p-toluenesulfonic acid or butyl p-toluene-sulfonate is preferable.

When the acidic compound is added in the present invention, a compound [B-1] having above formula [III], for example, is added in an amount of 0.05–10 ppm, preferably 0.1–5 ppm, and most preferably 0.2–2 ppm, based on the above copolymeric polycarbonate [A].

The alkaline metal compounds remaining in the copolymeric polycarbonate [A] are neutralized or weakened by the addition of the above-cited acidic compounds [B], and especially those compounds [B-1] having above formula [III], in the above-mentioned amount to the copolymeric polycarbonate obtained as the reaction product, making it possible to further enhance the residence stability and maintain a high water resistance, hue and transparency.

In the present invention, it is preferable to add epoxy compounds [C] together with the above-mentioned acidic compounds.

Compounds having one or more epoxy group per molecule can be used as these epoxy compounds [C]. There is no particular restriction on the amount used, although these are normally used in an amount of 1–2000 ppm, and preferably 1–1000 ppm, based on the copolymeric polycarbonate obtained as the reaction product.

Specific examples that may be cited of epoxy compounds such as these include epoxidized soybean oil, epoxidized linseed oil, phenylglycidyl ether, allylglycidyl ether, t-butylphenylglycidyl ether, 3,4-epoxycyclohexylmethyl- 3,4-epoxycyclohexane carboxylate, 3,4-epoxy-6-methylcyclohexylmethyl-3,4-epoxy-6-methylcyclohexane carboxylate, 2,3-epoxycyclohexylmethyl-3,4epoxycyclohexane carboxylate, 4-(3,4-epoxy-5-methyl-cyclohexyl)butyl- 3,4-epoxycyclohexane carboxylate, 3,4-epoxycyclohexylethylene oxide, cyciohexylmethyl-3,4-epoxycyclohexane carboxylate, 3,4-epoxy-6-methylcyclohexylmethyl- 6-methylcyclohexane carboxylate, bisphenol A diglycidyl ether, tetrabromobisphenol A glycidyl ether, the diglycidyl ester of phthalic acid, the diglycidyl ester of hexahydrophthalic acid, bisepoxydicyclopentadienyl ether, bis-epoxyethylene glycol, bis-epoxycyclohexyl adipate, butadiene diepoxide, tetraphenylethylene epoxide, octyl epoxyphthalate, epoxidized polybutadiene, 3,4-dimethyl-1,2-epoxycyclohexane, 3,5-dimethyl-1,2-epoxycyclohexane, 3-methyl- 5-t-butyl- 1,2-epoxycyl ohexane, octadecyl-2,2-dimethyl- 3,4-epoxycyclohexane carboxylate, N-butyl-2,2-dimethyl- 3,4-epoxycyclohexane carboxylate, cyclohexyl-2-methyl- 3,4-epoxycyclohexane carboxylate, N-butyl-2-isopropyl- 3,4-epoxy-5-methylcyclohexane carboxylate, octadecyl- 3,4-epoxycyclohexane carboxylate, 2-ethylhexyl-3',4'-epoxycyclohexane carboxylate, 4,6-dimethyl- 2,3-epoxycyclohexyl-3',4'-epoxycyclohexane carboxylate, 4,5-epoxytetrahydrophthalic anhydride, 3-t-butyl-4,5-epoxytetrahydrophthalic anhydride, diethyl-4,5-epoxy-cis-1,2-cyclohexane dicarboxylate and di-n-butyl-3-t-butyl-4,5-epoxy-cis-1,2-cyclohexane dicarboxylate. These may be used alone or as mixtures of two or more thereof. It is preferable to use an allcyclic epoxy compound, and especially 3,4-epoxycyclohexylmethyl-3,4-epoxycyclohexylcarboxylate, asthis epoxycompound [C].

In this invention, it is desirable to add to the copolymeric polycarbonate [A] a phosphorus compound [D] as a process stabilizer (antioxidant).

Examples of phosphorus compounds [D] that may be used include phosphoric acid, phosphorous acid, hypophosphorous acid, pyrophosphoric acid, polyphosphoric acid, phosphates, and phosphites.

Specific examples that may be cited of phosphates such as these include trialkylphosphates such as trimethylphosphate, triethylphosphate, tributylphosphate, trioctylphosphate, tridecylphosphate, trioctadecylphosphate, distearylpentaerythrityldiphosphate, tris (2-chloroethyl)phosphate and tris(2,3-dichloropropyl)phosphate; tricycloalkylphosphates such as tricyclohexylphosphate; and triarylphosphates such as triphenylphosphate, tricresylphosphate, tris(nonylphenyl)phosphate and 2-ethylphenyldiphenylphosphate.

Examples that may be cited of phosphites include those compounds having the following formula

P(OR)$_3$ (where R is an alicyclic hydrocarbon group, an aliphatic hydrocarbon group or an aromatic hydrocarbon group; the groups represented by R may be the same or different).

Specific examples that may be cited of compounds having this type of formula include trialkylphosphites such as trimethylphosphite, triethylphosphite, tributylphosphite, trioctylphosphite, tris (2-ethylhexyl)phosphite, trinonylphosphite, tridecylphosphite, trioctadecylphosphite, tristearylphosphite, tris (2-chloroethyl)phosphite and tris(2,3-dichloropropyl)phosphite; tricycloalkylphosphites such as tricyclohexylphosphite; triarylphosphites such as triphenylphosphite, tricresylphosphite, tris (ethylphenyl)phosphite, tris(nonylphenyl)phosphite and tris (hydroxyphenyl)phosphite; and arylalkylphosphites such as phenyldidecylphosphite, diphenyldecylphosphite, diphenylisooctylphosphite, phenylisooctylphosphite and 2-ethylhexyldiphenylphosphite.

Other examples of phosphites that may be cited include distearylpentaerythrityldiphosphite and bis-(2,4-di-t-butylphenyl) pentaerythrityldiphosphite.

These compounds can be used alone or as combinations thereof.

Of the above, it is desirable that the phosphorus compounds [D] be phosphites having the above formula, preferably aromatic phosphites, and most preferably tris(2,4-di-t-butylphenyl)phosphite.

In the present invention, phosphorus compounds [D] such as the above are added in an amount of 10–1000 ppm, and preferably 50–500 ppm, based on the polycarbonate [A].

When epoxy compounds and phosphorus compounds are added at the same time as the acidic compounds to the copolymeric polycarbonates obtained as the reaction product, the excess remaining acidic compounds are neutralized by reaction with the epoxy compounds, thereby giving copolymeric polycarbonates having enhanced water resistance and excellent color tone, heat resistance, residence stability and other properties.

In the copolymeric polycarbonate production method according to the present invention, there is no particular restriction on the method of adding the acidic compounds and, where necessary, the epoxy compounds and phosphorus compounds, to the copolymeric polycarbonate obtained as the reaction product. For example, the acidic compounds, and also the epoxy compounds and the phosphorus compounds, may be added to the copolymeric polycarbonate while the latter is in a molten state, and [these components] kneaded together; alternatively, the acidic compounds, and also the epoxy compounds and phosphorus compounds, may be added to the copolymeric polycarbonate and [these components] stirred together.

Specific examples that may be cited of methods for adding the acidic compounds and also the epoxy compounds and phosphorus compounds include a method whereby the acidic compounds, and also the epoxy compounds and phosphorus compounds are added either separately or at the same time to the copolymeric polycarbonate reaction product obtained with the completion of the polycondensation reaction and present in a molten state within a reactor or an extruder; and a method whereby the copolyeric polycarbonate obtained is pelletized and these pellets are fed, together with the acidic compounds and also the epoxy compounds and phosphorus compounds, into a single-screw or a twin-screw extruder, for example.

The order in which the acidic compounds, epoxy compounds and phosphorus compounds are added to the copolymeric polycarbonate is of no import.

In the present invention, additives such as conventional heat stabilizers, "chinubin"-type [sic] ultraviolet absorbers, parting agents, antistatic agents, slip agents, anti-blocking agents, lubricants, anti-fogging agents, dyes, pigments, natural oils, synthetic oils, waxes, organic fillers and inorganic fillers, may be added to the copolymeric polycarbonate obtained in the above manner, provided these do not have adverse effects upon the objects of this invention.

Examples that may be cited of such heat stabilizers include phenol-based stabilizers, organic thio-ether-based stabilizers, hindered amine-based stabilizers and epoxy-based stabilizers.

Specific examples that may be cited of phenol-based stabilizers include n-octadecyl-3(4-hydroxy- 3', 5'-di-t-butylphenyl)propionate, tetrakis[(methylene- 3-(3',5'-di-t-butyl-4-hydroxyphenyl)propionate]methane, 1,1,3-tris (2-methyl-4-hydroxy-5-t-butylphenyl)butane, distearyl(4-hydroxy-3- methyl-5-t-butyl)benzylmalonate and 4-hydroxymethyl-2,6-di-t-butylphenol. These may be used alone or as mixtures of two or more thereof.

Examples that may be cited of thioether-based stabilizers include dilauryl thiodipropionate, distearyl thiodipropionate, dimyristyl-3,3'-thiodipropionate, ditridecyl-3,3'-thiodipropionate and pentaerythritol-tetrakis-β-laurylthiopropionate). These may be used alone or as mixtures of two or more thereof.

Examples that may be cited of hindered amine-type stabilizers include bis(2,2,6,6-tetramethyl-4-piperidyl)sebacate, bis(1,2,2,6,6-pentamethyl-4-piperidyl)-sebacate, 1-(2-[3-(3,5-di-t-butyl- 4-hydroxyphenyl)-propionyloxy]-ethyl)-4-[3-( 3,5-di-t-butyl-4-hydroxyphenyl)-propionyloxy]- 2,2, 6,6-tetramethylpiperidine, 8-benzyl- 7,7,9,9-tetramethyl-3-octyl-1,2,3-triazaspiro [ 4,5]undecane- 2,4-dione, 4-benzoyloxy-2,2,6,6-tetramethylpiperidine, 2-(3,5-di-t-butyl-4-hydroxybenzyl)-2-n-butylmalonic acid bis(1,2,2,6,6-pentamethyl-4-piperidyl) and tetrakis(2,2,6,6-tetramethyl-4-piperidyl)1,2,3,4-butane-tetracarboxylate. These may be used alone or as mixtures of two or more thereof.

These heat stabilizers should be used in an amount of 0.001–5 parts by weight, preferably 0.005–0.5 part by weight, and most preferably 0.01–0.3 part by weight, per 100 parts by weight of the copolymeric polycarbonate.

These heat stabilizers may be added in a solid state or in a liquid state.

It is preferable that this type of heat stabilizer be added while the copolymeric polycarbonate is in a molten state during the period when it is cooled and pelletired [after removal] from the final polymerizer; by so doing, the thermal history incurred by the copolymeric polycarbonate is small. Moreover, when heating treatment such as extrusion or palletization is again carried out, thermal decomposition can be suppressed because the copolymeric polycarbonate contains a heat stabilizer.

When adding the above-described heat stabilizer, ultraviolet absorbers can be added at the same time. These may be conventional ultraviolet absorbers, although there is no particular restriction on the type of ultraviolet absorber used. Examples that may be cited of these ultraviolet absorbers include salicylic acid-type ultraviolet absorbers, benzophenone-type ultraviolet absorbers, benzatriazole-type ultraviolet absorbers, and cyanoacrylate-type ultraviolet absorbers.

Specific examples of salicylic acid-type ultraviolet absorbers that may be cited include phenylsalicylate and p-t-butylphenylsalicylate.

Examples that may be cited of benzophenone-type ultraviolet absorbers include 2,4-dihydroxybenzophenone, 2-hydroxy-4-methoxybenzophenone, 2,2'-dihydroxy- 4-methoxybenzophenone, 2,2'-dihydroxy-4,4'-dimethoxybenzophenone, 2-hydroxy-4-methoxy-2'-carboxybenzophenone, 2-hydroxy-4-methoxy-5-sulfobenzophenonetrihydrate, 2-hydroxy-4-n-octoxybenzophenone, 2,2',4,4'-tetrahydroxybenzophenone, 4-dodecyloxy-2-hydroxybenzophenone, bis(5-benzoyl-4-hydroxy-2-methoxyphenyl)-methane. and 2-hydroxy-4-methoxybenzophenone-5-sulfonic acid.

Examples that may be cited of benzotriazole-type ultraviolet absorbers include 2-(2'-hydroxy-5'-methylphenyl)benzotriazole, 2-(2'-hydroxy-3',5'-di-t-butylphenyl)benzotriazole, 2-(2'-hydroxy-3-'-t-butyl- 5'-methylphenyl)-5-chlorobenzotriazole, 2-(2'-hydroxy- 3',5'-di-t-butylphenyl)-5-chlorobenzotriazole, 2-( 2'-hydroxy-5'-t-octylphenyl)benzotriazole, 2-(2'-hydroxy- 3',5'-di-t-amylphenyl)benzotriazole, 2-[2'-hydroxy-3'-( 3", 4",5",6"-tetrahydrophthalimidomethyl)- 5'-methylphenyl] benzotriazole and 2,2'-methylenebis[4-( 1,1,3,3-tetramethylbutyl)-6-(2H-benzotriazole-2-yl)phenol.

Examples that may be cited of cyanoacrylate-type ultraviolet absorbers include 2-ethylhexyl-2-cyano-3,3-diphenylacrylate and ethyl-2-cyano-3,3-diphenylacrylate. These may be used alone or as mixtures of two or more thereof.

These ultraviolet absorbers can generally be used in an amount of 0.001–5 parts by weight, preferably 0.005–1.0 part by weight, and even more preferably 0.01–0.5 part by weight, per 100 parts by weight of the copolymeric polycarbonate.

In the present invention, when heat stabilizers such as the above are added, parting agents can be added at the same time. There is no particular restriction on the parting agents, it being possible to use common parting agents. Examples of hydrocarbon-type parting agents that may be cited include natural and synthetic paraffins, polyethylene waxes and fluorocarbons.

Examples that may be cited of fatty acid-type parting agents are higher fatty acids such as stearic acid and hydroxystearic acid, and oxyfatty acids.

Examples that may be cited of fatty amide-type parting agents include fatty amides such as stearamide and ethylenebisstearamide, and alkylenebisfatty amides.

Examples that may be cited of alcohol-type parting agents include fatty alcohols such as stearyl alcohol and cetyl alcohol, polyhydric alcohols, polyglycols and polyglycerols.

Examples that may be cited of fatty ester-type parting agents include the lower alcohol esters of fatty acids such as butyl stearate and pentaerythritol tetrastearate, the polyhydric alcohol esters of fatty acids, and the polyglycol esters of fatty acids.

Examples that may be cited of silicone-type parting agents include silicone oils.

These may be used alone or as mixtures of two or more thereof. These parting agents can generally be used in an amount of 0.001–5 parts by weight, preferably 0.005–1 part by weight, and most preferably 0.01–0.5 part by weight, per 100 parts by weight of the copolymeric polycarbonate.

In the present invention, when heat stabilizers such as the above are added, colorants can be added at the same time. The colorants may be pigments or dyes. There are both inorganic and organic colorants, either of which may be used; it is also possible to use combinations of both.

Specific examples that may be cited of inorganic colorants include oxides such as titanium dioxide and red oxide, hydroxides such as alumina white, sulfides such as zinc sulfide, selenides, ferrocyanides such as Prussian blue, chrometee such as zinc chromate and molybdenum red, sulfates such as barium sulfate, carbonates such as calcium carbonate, silicates such as ultramarine blue, phosphates such as manganese violet, carbons such as carbon black, and metal powder colorants such as bronze powder and aluminum powder.

Specific examples of organic colorants that may be cited include nitroso compounds such as naphthol green B, nitro compounds such as nephthol yellow S, azo compounds such as lithol red, bordeaux 10B, naphthol red and chromophthal yellow; phthalocyanine compounds such as phthalocyanine blue and fast sky blue, and condensed polycyclic colorants such as indanthrone blue, quinacridone violet and dioxazine violet.

These colorants may be used alone or as combinations thereof.

These colorants can generally be used in an amount of $1 \times 10^{-6}$ to 5 parts by weight, preferably $1 \times 10^5$ to 3 parts by weight, and most preferably $1 \times 10^{-5}$ to 1 part by weight, per 100 parts by weight of the copolymeric polycarbonate.

In the present invention, vacuum treatment may be administered after adding the acidic compounds and, if needed, the epoxy compounds, to the copolymeric polycarbonate obtained by means of the polycondensation reaction.

There is no particular restriction on the apparatus used when carrying out this type of vacuum treatment; for example, a reactor equipped with a vacuum apparatus or an extruder equipped with a vacuum apparatus may be used.

When a reactor is used, this may be either a vertical tank-type reactor or a horizontal tank-type reactor, although use of a horizontal tank-type reactor is most preferable.

When the vacuum treatment is conducted in the above-described type of reactor, it is carried out at a pressure of 0.05–750 ramrig, and preferably 0.05–5 mmHg.

When this kind of vacuum treatment is conducted using an extruder, it should be carried out over a period of about 10 seconds to 15 minutes. When it is conducted using a reactor, it should be carried out over a period of about 5 minutes to 3 hours. The vacuum treatment should be carried out at a temperature of about 240°–350° C.

When the vacuum treatment is carried out in an extruder, a single-screw extruder or twin-screw extruder equipped with a belt may be used. Pelletization can be carried out while conducting vacuum treatment in an extruder.

When vacuum treatment is carried out in an extruder, the vacuum treatment is carried out at a pressure of 1–750 ramrig, and preferably 5–700 ramrig.

When vacuum treatment is administered in this way after the addition to the copolymeric polycarbonate obtained as the reaction product of the acidic compounds, epoxy compounds and phosphorus compounds, a copolymeric polycarbonate with a reduced level of residual monomers and oligomers can be obtained.

The copolymeric polycarbonate obtained as described above may be obtained as a random copolymer consisting of constituent units derived from hydroquinone and/or substituted hydroquinones and constituent units derived from aromatic dihydroxy compounds other than hydroquinone and/or substituted hydroquinones.

With copolymeric polycarbonates such as this, copolymeric polycarbonate moldings can be formed which not only have an excellent heat resistance, water resistance and weatherability, but have an especially outstanding fluidity and moldability during molding, and have outstanding molding qualities. Also, because [the invented method] is able to provide copolymeric polycarbonate moldings having excellent hue stability even during long-term use, it can be used with excellent results in optical applications such as sheets, lens and compact disks, applications used outdoors such as automobiles, and housings for various kinds of equipment.

Moreover, not only do the copolymeric polycarbonates obtained in the present invention have thermal decomposition temperatures as high as those for conventional polycarbonates, they have an especially outstanding chemical resistance to gasoline and the like. Hence, ideal use can be made of these in the molding of components used in and about automobile engines.

Advantages of the Invention

In the copolymeric polycarbonate production method according to the present invention, an aromatic dihydroxy compound containing hydroquinone and/or substituted hydroquinones in an amount of 2–90 mol % is melt-copolymerized with a diester carbonate in the presence of a specific catalyst, thereby preparing a copolymeric polycarbonate. By means of this invention, copolymeric polycarbonates can be prepared which have excellent mechanical properties, heat resistance, transparency and hue, and which also have an even further improved chemical resistance, residence stability and water resistance.

In the production method according to the present invention, because treatment is preferably carried out by adding acidic compounds and also epoxy compounds and phosphorus compounds to the copolymeric polycarbonate reaction product obtained, the effects of the alkaline compounds used as the catalyst which remain behind in the copolymeric polycarbonate are either neutralized or weakened: moreover, the adverse influence of the acidic compounds added can be reduced by the epoxy compound. Consequently, by means of the copolymeric polycarbonate production method according to the present invention, it is possible to suppress the adverse influence of the catalyst and to produce copolymeric polycarbonates having excellent heat resistance, water resistance and weatherability, as well as outstanding stability while in a prolonged molten state.

The present invention shall now be illustrated more concretely through the following examples, although it shall be understood that these examples do not limit the scope of the invention.

EXAMPLES

The physical measurement methods and test methods are indicated below.

Melt Flow Rate (MFR): This was measured at a temperature of 300° C. and a load of 1.2 kg in general accordance with the method in JIS K-7210.

Yellowuess (YI): An injection-molded sheet having a thickuess of 3 mm was molded ax: a cylinder temperature of 290° C., an injection pressure of kg/cm$^2$, a cycle time of 45 seconds, and a mold temperature of 100° C. The X, Y aud 7. values were measured by the transmission method using a Color and Color Difference Meter ND-1001 DP made by Nippon Denshoku Kogyo KK, and the yellow index (YI) was measured.

$$YI=100(1.277X-1.060Z)/Y$$

Light Transmittance: Using, the injection molded sheet prepared for hue measurement, the light transmittance was measured in accordance with the method in ASTM D 1003.

Haze: The haze of the injection-molded sheet for hue measurement was measured using an NDH-200 made by Nippon Denshoku Kogyo KK.

Residence Stability: After retaining the resin within the cylinder of the injection molding machine for 15 minutes at a temperature of 320° C., injection molding was carried out at that temperature.

The yI and light transmittance of the molded sheet were measured.

Water Resistance: The injection-molded sheet for hue measurement was immersed in water within an autoclave, and held for 5 days in an oven at 125° C. The haze was measured using this test piece. The injection molding machine used was a model PS60-9ASE made by Nissei Plastic Industrial Co.

Resistance to Chemicals: One gram samples of the resin were respectively immersed for 24 hours in 100-cc amounts of hexafluoropropanol, toluene, methylene chloride, chloroform and o-chlorophenol.

Example 1

A 250-liter tank-type stirring tank was charged with 0.22 kilomole of bisphenol A (GE Plastics Japan). 0.22 kilomole of hydroquinone (Mitsui Petrochemical Industries) and 0.46 kilomole of diphenyl carbonate ("Enii", Co.), and the tank was flushed with nitrogen, following which [the mixture] was melted at 140° C.

Next, the temperature was raised to 180° C. 0.11 mole of tetramethylammonium hydroxide (Me$_4$NOH) and 0.00044 mole of sodium hydroxide were added as the catalysts, and the mixture was stirred for 30 minutes. The temperature was then raised to 210° C. and the pressure was at the same time gradually lowered to 200 mmHg; 30 minutes later, the temperature was raised to 240° C. and the pressure was simultaneously lowered gradually to 15 mmHg, after which the temperature and pressure were held constant and the amount of phenol distilled off was measured. The instant that phenol stopped being driven off, the pressure was returned to atmospheric pressure with nitrogen. The time required for reaction was one hour.

Next, this reaction product was pressurized with a gear pump and sent into a centrifugal thin-film evaporator, where the reaction was allowed to proceed. The temperature and pressure of the thin-film evaporator were respectively controlled to 270° C. and 2 mmHg. [The reaction product] was sent by means of a gear pump from the bottom of the evaporator into a two-shaft lateral-type stirring polymerization tank (L/D =3; stirring element rotational diameter, 220 mm; capacity, 80 liters) controlled to 290° C. and 0.2 mmHg at a rate of 40 kg/hour, and polymerized at a residence time of 30 minutes.

The MFR of the polymer thus obtained was 11 g/10 min. The results are Siren in Table 1.

Example 2

A copolymeric polycarbonate was obtained in the same manner as in Example 1, except that the amount of bisphenol A was changed to 0.33 kilomole and the amount of hydroquinone was changed to 0.11 kilomole.

The results are given in Table 1.

Example 3

A 250-liter tank-type stirring tank was charged with 0.22 kilomole of bisphenol A (GE Plastics Japan), 0.22 kilomole of hydroquinone (Mitsui Petrochemical Industries) and 0.46 kilomole of diphenyl carbonate ("Enii" Co.), and the tank was flushed with nitrogen, following which [the mixture] was melted at 140° C.

Next, the temperature was raised to 180° C., 0.11 mole of triphenyl borate [B(OPh)$_3$] was added, and the mixture was stirred for 30 minutes. Next, 0.11 mole of tetramethylammonium hydroxide and 0.00044 mole of sodium hydroxide were added, and the mixture was stirred for 30 minutes. The temperature was then raised to 210° C. and the pressure was at the same time gradually lowered to 200 ramrig; 30 minutes later, the temperature was raised to 240° C. and the pressure was simultaneously lowered gradually to 15 mmHg, after which the temperature and pressure are held constant and the amount of phenol distilled off was measured. The instant that the phenol stopped being driven off, the pressure was returned to atmospheric pressure with nitrogen. The time required for reaction was one hour.

Next, this reaction product was pressurized with a gear pump and sent into a centrifugal thin-film evaporator, where the reaction was allowed to proceed. The temperature and pressure of the thin-film evaporator were respectively controlled to 270° C. and 2 mmHg. [The reaction product] was sent by means of a gear pump from the bottom of the evaporator into a two-shaft lateral-type stirring polymerization tank (L/D =3; stirring element rotational diameter, 220 ram; capacity. 80 liters) controlled to 290° C. and 0.2 mmHg at a rate of 40 kg/hour, and polymerized at a residence time of 30 minutes.

The MFR of the polymer thus obtained was 13 g/10 min. The results are given in Table 1.

Examples 4–6

The various additives indicated in Table I were respectively formulated into the copolymeric polycarbonate obtained in Example 1, following which [the mixtures were] kneaded in a single-screw extruder (L/D= 31,290° C.) and pelletized.

The results are given in Table 1.

Example 7

A copolymeric polycarbonate was obtained in the same manner as in Example 1, except that 0.00022 mole of sodium hydroxide was added.

The results are given in Table 1.

Example 8

A copolymeric polycarbonate was obtained in the same manner as in Example 1, except that tetramethylammoniumhydroxide was not added.

The results are given in Table 1.

Comparative Example 1

A copolymeric polycarbonate was obtained in the same manner as in Example 1, except that 0.0044 mole of sodium hydroxide was added (this was ten times as much as in Example 1) and the final polymerization temperature was set at 285° C.

The results are given in Table 1.

Comparative Example 2

The various additives indicated in Table 1 were formulated into the copolymeric polycarbonate obtained in Comparative Example 1, following which [the mixture was] kneaded in a single-screw extruder (L/D=31, 290° C.) and pelletized.

The results are given in Table 1.

Example 9

One-gram samples of the copolymeric polycarbonate obtained in Example I were immersed in hexafluoropropanol, toluene, methylene chloride, chloroform, and o-chlorophenol for 24 hours and at room temperature The results are given in Table 2.

Comparative Example 3

The same procedure was carried out as in Example 9. except that the polycarbonate Lexan 141-111 (GE Plastics Japan) was used.

The results are given in Table 2.

TABLE 1

| | Example 1 | Example 2 | Example 3 | Example 4 |
|---|---|---|---|---|
| Bisphenol A/hydroquinone (charging mole ratio) | 50/50 | 75/25 | 50/50 | 50/50 |
| Catalyst | | | | |
| a) NaOH amount, $10^{-6}$ mol/BPA | 1.0 | 1.0 | 1.0 | 1.0 |
| b) Me$_4$NOH amount ($10^{-4}$ mole/BPA) | 2.5 | 2.5 | 2.5 | 2.5 |
| c) B(OPh)$_3$ amount ($10^{-4}$ mole/BPA) | — | — | 0.25 | — |
| [B] Acidic Compound (amount used, ppm) | — | — | — | BTS 1.8 |
| [C] Epoxy Compound (ppm) [Celoxide 2021 P; Daicel] | — | — | — | — |
| [D] Phosphorus Compound [bis(2,4,-di-t-butyl-phenyl)phosphite] | — | — | — | — |
| Initial properties | | | | |
| MFR (g/10 min) | 11 | 10 | 13 | 11 |
| Hue (YI) | 2.1 | 2.0 | 2.0 | 2.1 |
| Light transmittance (%) | 90.8 | 90.8 | 90.8 | 90.8 |
| Haze | 0.3 | 0.3 | 0.3 | 0.3 |
| Residence stability | | | | |
| MFR (g/10 min) | 13 | 11 | 14 | 12 |
| MFR rise (%) | 15 | 10 | 8 | 5 |
| Hue (YI) | 2.4 | 2.3 | 2.2 | 2.4 |
| Light transmittance (%) | 90.7 | 90.7 | 90.7 | 90.7 |
| Water resistance Haze | 10 | 8 | 11 | 13 |

| | Example 5 | Example 6 | Example 7 | Example 8 |
|---|---|---|---|---|
| Bisphenol A/hydroquinone (charging mole ratio) | 50/50 | 50/50 | 50/50 | 50/50 |
| Catalyst | | | | |
| a) NaOH amount, $10^{-6}$ mol/BPA | 1.0 | 1.0 | 0.5 | 1.0 |
| b) Me$_4$NOH amount ($10^{-4}$ mole/BPA) | 2.5 | 2.5 | 2.5 | — |
| c) B(OPh)$_3$ amount ($10^{-4}$ mole/BPA) | — | — | — | — |
| [B] Acidic Compound (amount used, ppm) | BTS 1.8 | BTS 1.8 | — | — |
| [C] Epoxy Compound (ppm) [Celoxide 2021 P; Daicel] | 300 | 300 | — | — |
| [D] Phosphorus Compound [bis(2,4,-di-t-butyl-phenyl)phosphite] | — | 300 | — | — |
| Initial properties | | | | |
| MFR (g/10 min) | 11 | 11 | 12 | 13 |
| Hue (YI) | 2.1 | 2.1 | 1.9 | 2.1 |
| Light transmittance (%) | 90.8 | 90.8 | 90.8 | 90.8 |
| Haze | 0.3 | 0.3 | 0.3 | 0.3 |
| Residence stability | | | | |
| MFR (g/10 min) | 12 | 12 | 13 | 15 |
| MFR rise (%) | 5 | 5 | 10 | 15 |
| Hue (YI) | 2.4 | 2.2 | 2.1 | 2.4 |
| Light transmittance (%) | 90.7 | 90.7 | 90.7 | 90.7 |
| Water resistance Haze | 3 | 4 | 6 | 11 |

| | Comp. Ex. 1 | Comp. Ex. 2 |
|---|---|---|
| Bisphenol A/hydroquinone (charging mole ratio) | 50/50 | 50/50 |
| Catalyst | | |
| a) NaOH amount, $10^{-6}$ mol/BPA | 10.0 | 10.0 |
| b) Me$_4$NOH amount ($10^{-4}$ mole/BPA) | 2.5 | 2.5 |
| c) B(OPh)$_3$ amount ($10^{-4}$ mole/BPA) | — | — |
| [B] Acidic Compound (amount used, ppm) | — | BTS 18.0 |
| [C] Epoxy Compound (ppm) [Celoxide 2021 P; Daicel] | — | 300 |
| [D] Phosphorus Compound [bis(2,4,-di-t-butyl-phenyl)phosphite] | — | 300 |
| Initial properties | | |
| MFR (g/10 min) | 11 | 11 |
| Hue (YI) | 3.0 | 2.9 |
| Light transmittance (%) | 90.7 | 90.7 |
| Haze | 0.4 | 0.4 |
| Residence stability | | |
| MFR (g/10 min) | 20 | 13 |
| MFR rise (%) | 82 | 20 |
| Hue (YI) | 3.8 | 3.2 |
| Light transmittance (%) | 90.6 | 90.6 |
| Water resistance Haze | 87 | 75 |

BTS = butyl p-toluenesulfonate

TABLE 2

| Solvent | Example 9 | Comp. Ex. 3 |
|---|---|---|
| Hexafluoropropanol | insoluble | soluble |
| Toluene | insoluble | soluble |
| Methylene chloride | insoluble | soluble |
| Chloroform | insoluble | soluble |
| o-Chlorophenol | insoluble | soluble |

Concentration, 1%; room temperature; 24-hour immersion.

We claim:

1. A method for preparing copolymeric polycarbonates comprising melt polycondensing a mixture of an aromatic dihydroxy compound containing an amount of 2–90 mol % of hydroquinone or substituted hydroquinones and a diester carbonate in the presence of a catalyst containing an alkali metal compound or an alkaline earth metal compound in an amount of $1\times10^{-8}$ to $5\times10^{-6}$ mole per mole of the total amount of the aromatic dihydroxy compound, then adding an acidic compound[B] to the melt polycondensation product [A].

2. A method for preparing copolymeric polycarbonates according to claim 1, whereby the alkali metal compounds and/or alkaline earth metal compounds (a) are used in an amount of $1\times10^7$ to $2\times10^{-6}$ mole per mole of the aromatic dihydroxy compound.

3. A method for preparing copolymeric polycarbonates according to claim 1 the acidic compound [B] is a sulfonic acid compound [B-1] having formula [III] below, and where said sulfonic acid compound [B-1] is used in an amount of 0.05–10 ppm based on the B melt polycondensation product.

where R$^7$ is a hydrocarbon group having 1–6 carbons (in which the hydrogens may be substituted with halogens). R$^8$ is a hydrocarbon group with 1–8 carbons (in which the hydrogens may be substituted with halogens), and n is an integer from 0 to 3].

4. A method for preparing copolymeric polycarbonates according to claim 3 wherein the sulfonic acid compound

[B-1] having above formula [III] is added as the acidic compound [B] in an amount of 0.1–5 ppm. based on the melt polycondensation product [A] obtained as the reaction product.

5. A method for preparing melt polycondensation product according to claim 3 wherein the sulfonic acid compound [B-1] having above formula [III] is added as the acidic compound [B] in an amount of 0.2–2 ppm, based on the copolymeric polycarbonate [A] obtained as the reaction product.

6. A method for preparing copolymeric polycarbonates according to claim 3 wherein the acidic compound [B] is a sulfonic acid compound having above formula [III], in which $R^7$ is a methyl group, $R^8$ is a hydrogen or an aliphatic hydrocarbon group having 1–6 carbons, and n is 0 or 1.

7. A method for preparing copolymeric polycarbonates according to claim 3, wherein the acidic compound [B] is butyl p-toluenesulfonate or p-toluenesulfonic acid.

* * * * *